(12) United States Patent
Bush et al.

(10) Patent No.: US 8,774,989 B1
(45) Date of Patent: Jul. 8, 2014

(54) AIRCRAFT ENERGY STATE DISPLAY

(71) Applicant: The Boeing Company, Chicago, IL (US)

(72) Inventors: Larry Wayne Bush, Sherwood, OR (US); Neil John Clark, Portland, OR (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/780,715

(22) Filed: Feb. 28, 2013

(51) Int. Cl.
*G05D 1/06* (2006.01)
*G06F 17/00* (2006.01)

(52) U.S. Cl.
USPC .................... 701/14; 701/9; 701/16; 340/952

(58) Field of Classification Search
USPC .......... 701/14, 9, 108, 16, 29.1; 340/951, 952
See application file for complete search history.

(56) References Cited

U.S. PATENT DOCUMENTS

| | | | | |
|---|---|---|---|---|
| 4,316,252 A | * | 2/1982 | Cooper | 701/16 |
| 6,062,513 A | * | 5/2000 | Lambregts | 244/175 |
| 7,916,042 B2 | * | 3/2011 | Constans | 340/945 |
| 2003/0171856 A1 | * | 9/2003 | Wilf | 701/16 |
| 2011/0025530 A1 | * | 2/2011 | He | 340/972 |
| 2012/0277936 A1 | * | 11/2012 | Kumar et al. | 701/16 |

OTHER PUBLICATIONS

"FCOM 820/1—Ground Speed Mini Function," Biggles Software, copyright 2002-2010, 6 pages, accessed Feb. 27, 2013. http://inral.com/Atto/bulletins/fcom_ground_speed_mini_function.htm.
"Flight Operations Briefing Notes: Adverse Weather Operations—Windshear Awareness," Airbus, Oct. 2007, 15 pages.
"PPRuNe Forums: Ground & Other Opps Forums: Questions: What is ground speed mini?," PPRuNe Professional Pilots Rumour Network, Mar. 2010, 9 pages, accessed Feb. 28, 2013. www.pprune.org/questions/408276-what-ground-speed-mini.html.

\* cited by examiner

*Primary Examiner* — Tan Q Nguyen
(74) *Attorney, Agent, or Firm* — Yee & Associates, P.C.

(57) ABSTRACT

A method and apparatus for displaying an energy state of an aircraft. The energy state of the aircraft is identified by a processor unit based on a speed of the aircraft and an altitude of the aircraft. An indication of the energy state is displayed by the processor unit.

16 Claims, 7 Drawing Sheets

AIRCRAFT ENERGY STATE DISPLAY

BACKGROUND INFORMATION

1. Field

The present disclosure relates generally to systems and methods for displaying information for indicating the state of an aircraft to a flight crew. More particularly, the present disclosure relates to displaying information indicating the energy state of an aircraft to a flight crew as the aircraft is descending to land.

2. Background

Airspeed is the speed of an aircraft in flight relative to the air around the aircraft. If the airspeed of an aircraft is too low, the aircraft may stall. An airspeed that is too high during cruise flight of the aircraft may cause flutter. An airspeed that is too high during an approach to landing may cause damage to the aircraft flaps or other aircraft systems.

Ground speed is the speed of an aircraft with respect to the ground over which it is flying. At certain times during the operation of an aircraft, it may be desirable that the ground speed of the aircraft is not too high or too low. For example, the ability of an aircraft to fly through wind shear conditions may be reduced if the ground speed of the aircraft is too low during an approach and landing operation. If the ground speed of an aircraft is too high during approach and landing, the aircraft may land beyond the end of the runway, or may land at a position on the runway and with such speed that it may be difficult to stop the aircraft before the aircraft reaches the end of the runway. The desired upper limit of the ground speed of an aircraft during an approach may be determined using a stopping distance calculation for the aircraft.

A pilot or other operator of an aircraft may control the speed of the aircraft, both the airspeed and ground speed, by controlling the pitch, power setting, or both the pitch and power setting of the aircraft. Changing the pitch of the aircraft changes the angle of attack between the aircraft and the oncoming flow of air through which the aircraft is flying. The power setting of the aircraft may be changed by changing the power delivered by the aircraft engines to move the aircraft through the air. This power is often referred to as the thrust provided by the aircraft engines.

A pilot or other operator of an aircraft controls the aircraft so that the airspeed is within desired limits. Currently, ground speed is not usually considered during many aircraft operations. However, considering ground speed may be helpful in some aircraft operations. For example, considering the aircraft ground speed may be helpful in performing approach operations in gusty wind conditions.

Controlling an aircraft so that both the airspeed and ground speed of the aircraft are within desired limits may be challenging in some cases under some operational conditions. For example, a sudden increase in the headwind encountered by an aircraft during an approach and landing operation may cause the airspeed of the aircraft to increase suddenly. A human pilot, or automatic control system, may respond to the increase in airspeed by reducing the power setting of the aircraft. However, reducing the power output of the aircraft engines may reduce the ground speed of the aircraft to a speed that is below the desired ground speed for landing the aircraft. For example, reducing the power setting in this case may reduce the ground speed below a desired ground speed for responding to wind shears, downbursts, and other sudden changes in the winds around the aircraft, such as when a headwind gust suddenly dies out.

Accordingly, it would be beneficial to have a method and apparatus that takes into account one or more of the issues discussed above as well as possibly other issues.

SUMMARY

A first illustrative embodiment provides a method for displaying an energy state of an aircraft. The energy state of the aircraft is identified by a processor unit based on a speed of the aircraft and an altitude of the aircraft. An indication of the energy state is displayed by the processor unit.

Another illustrative embodiment provides an apparatus comprising an energy state identifier and an operator interface generator. The energy state identifier is configured to identify an energy state of an aircraft based on a speed of the aircraft and an altitude of the aircraft. The operator interface generator is configured to generate an energy state display comprising an indication of the energy state.

Another illustrative embodiment provides a method for identifying a projected stopping point of an aircraft. An energy state of the aircraft is identified by a processor unit during an approach to landing using a ground speed of the aircraft and an altitude of the aircraft. The projected stopping point of the aircraft is identified by the processor unit using the energy state of the aircraft.

The features, functions, and benefits may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of illustrative embodiments of the present disclosure when read in conjunction with the accompanying drawings, wherein:

DETAILED DESCRIPTION

The different illustrative embodiments recognize and take into account a number of different considerations. "A number," as used herein with reference to items, means one or more items. For example, "a number of different considerations" means one or more different considerations.

The different illustrative embodiments recognize and take into account that currently, the ground speed of an aircraft may not be taken into account to determine the energy state of an aircraft during an approach to landing. The different illustrative embodiments recognize and take into account that using ground speed information to determine the energy state of an aircraft during approaches may improve the quality and increase the safety of aircraft landing, especially in adverse weather conditions.

The different illustrative embodiments recognize and take into account that the information provided to pilots on final approach to landing may not allow the pilot to respond in a desired manner to changing wind conditions. The different illustrative embodiments also recognize and take into account that the current algorithms used by automatic control systems may result in undesired responses to changing wind conditions on final approach in certain situations. For example, currently, a pilot or automatic control system may respond to encountering a headwind gust on final approach to landing by reducing the power setting of the aircraft. However, if the headwind suddenly goes away, there may not be enough time to increase the power provided by the aircraft engines before running out of airspeed and altitude, resulting in landing short of the runway. Such a scenario is possible if the aircraft encounters a downburst on final approach.

In a downburst, the aircraft typically first encounters a headwind followed by the downflow itself. Then the aircraft may enter the outflow, resulting in an even larger sudden change in airspeed. Keeping the ground speed up helps deal with the downflow and the outflow. Currently, a human pilot or an automatic control system may not be provided with sufficient or appropriate information for controlling the aircraft in the most desired and effective manner in response to such situations.

The different illustrative embodiments recognize and take into account that currently, an approach to landing an aircraft may be flown at a speed that is sufficiently above the stall speed of the aircraft to provide a reasonable amount of margin for landing the aircraft on the runway at a desired position and speed in various weather conditions. For example, a typical approach to landing may be flown at 1.3 times the stall speed of the aircraft. One half of the steady headwind component and a full gust factor may be added to determine a target airspeed for the aircraft. This provides a sufficient margin in most cases. The target airspeed and the wind conditions at the airport are then used to calculate a desired ground speed for the approach.

In extreme conditions, the typical margin above the stall speed of the aircraft that may be used during an approach to landing may not be sufficient. A downburst is one example of possible extreme conditions. Another example would be very high winds occurring during extreme weather conditions, such as in a hurricane. Many airports may have wind shear warning systems or other systems that may provide the pilot with a warning that such extreme landing conditions may exist. The pilot may then respond appropriately, such as by adjusting the target approach speed. However, there are also many other airports that may not have wind shear or other warning systems of this type. Furthermore, a downburst, or other sudden change in wind conditions may affect an aircraft before the ground based sensors that are part of a wind shear warning system or other ground based warning system may detect the condition.

The different illustrative embodiments provide a system and method for taking into account the ground speed of an aircraft during an approach and landing operation. In accordance with an illustrative embodiment, the ground speed of the aircraft may be used to identify an energy state of the aircraft as the aircraft approaches a runway to land.

An indication of the energy state of the aircraft may be presented to the pilot in a manner that allows the pilot to use the information to respond more effectively to changing wind conditions during the approach to landing. For example, an indication of the energy state of the aircraft may indicate the difference between the current energy state of the aircraft and a desired energy state of the aircraft at a current point in the approach to landing. The pilot may respond by decreasing the power setting of the aircraft if the current energy state of the aircraft is greater than the desired energy state. Similarly, the pilot may respond by increasing the power setting of the aircraft if the current energy state is below the desired energy state.

Since the energy state for the aircraft is determined based on ground speed, the energy state information displayed to the pilot in the energy state display reduces the likelihood that the pilot will change the power setting of the aircraft in an undesired manner in response to changing wind conditions that may affect the airspeed of the aircraft but does not affect the desired ground speed for landing the aircraft. In accordance with an illustrative embodiment, the energy state of the aircraft also may be used as a factor to consider in addition to currently used factors, such as airspeed and altitude, by an automatic control system for controlling the aircraft during approach and landing.

Figure 1:
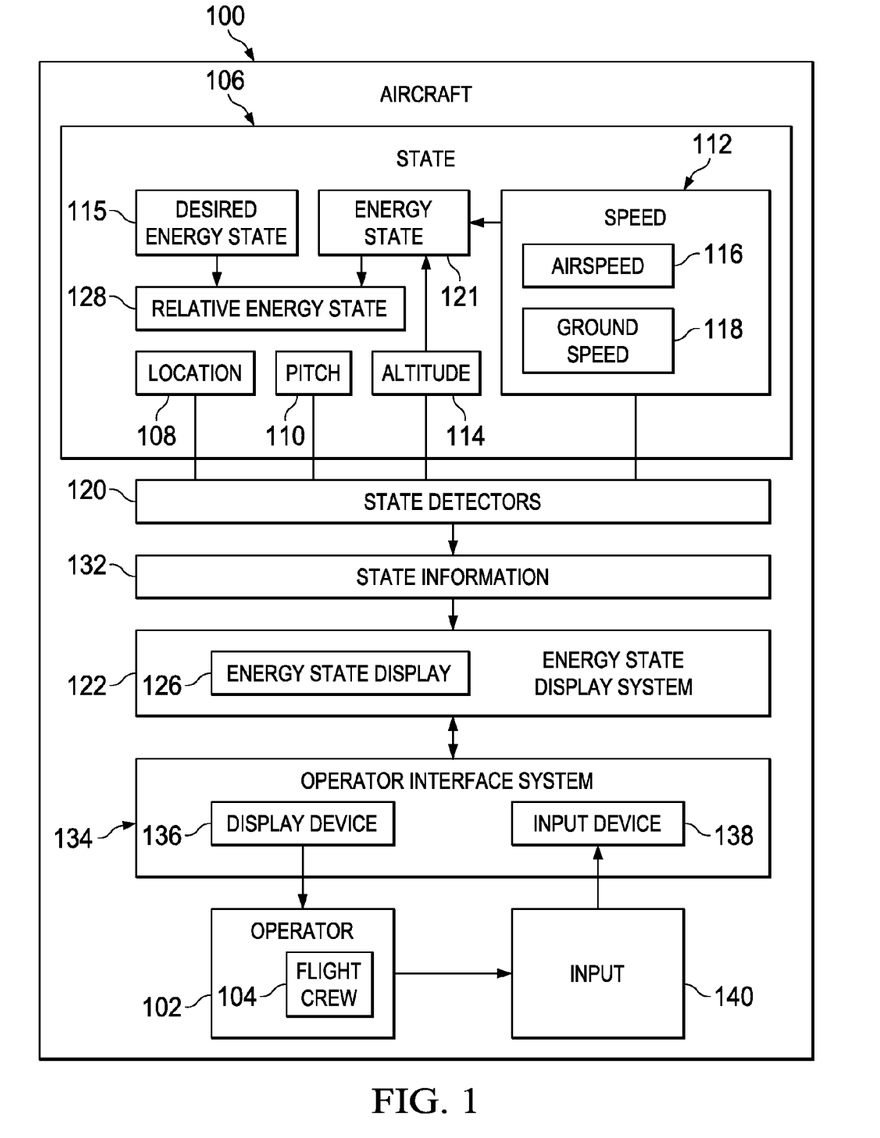
FIG. 1 is an illustration of a block diagram of an aircraft in accordance with an illustrative embodiment.

Turning now to FIG. 1, an illustration of a block diagram of an aircraft is depicted in accordance with an illustrative embodiment. Aircraft 100 may be any type of aircraft. For example, without limitation, aircraft 100 may be a passenger aircraft, a cargo aircraft, a military aircraft, or any other type of aircraft. Aircraft 100 may be operated by an airline or other commercial entity, a military unit or any other government entity, or any other public or private entity.

Aircraft 100 may be a manned aircraft or an unmanned aircraft. If aircraft 100 is a manned aircraft, aircraft 100 may be controlled by operator 102 onboard aircraft 100. For example, operator 102 onboard aircraft 100 may include flight crew 104. Flight crew 104 may include a pilot or other human operator of aircraft 100. If aircraft 100 is an unmanned aircraft, operator 102 may control aircraft 100 from a remote location that is not onboard aircraft 100.

State 106 of aircraft 100 may define various characteristics of aircraft 100 at a particular point in time. For example, without limitation, state 106 of aircraft 100 may include location 108, pitch 110, speed 112, and altitude 114 of aircraft 100. Other characteristics of aircraft 100 may include rate of descent, rate of climb, pitch rate, acceleration, deceleration, turn rate, bank angle, wind conditions affecting the aircraft, other characteristics, or various combinations of characteristics. However, not all of these possible characteristics may be used or displayed in illustrative embodiments.

Location 108 of aircraft 100 may refer to the geographic location of aircraft 100. For example, location 108 may refer to the location of a point on the earth directly below aircraft 100 when aircraft 100 is in flight. Location 108 may be used to determine the distance from aircraft 100 to a location of interest. For example, location 108 of aircraft 100 may be used to determine the distance of aircraft 100 in flight from a runway on which aircraft 100 is attempting to land.

Location 108 of aircraft also may be used to determine desired energy state 115. Desired energy state 115 may include an altitude of the approach course at the current distance from the runway.

Pitch 110 may refer to the nose up or down angle of aircraft 100 relative to the horizontal. Pitch 110 of aircraft 100 may be changed by operator 102 to control speed 112, altitude 114, or both speed 112 and altitude 114 of aircraft 100.

Speed 112 of aircraft 100 may be airspeed 116 or ground speed 118. Airspeed 116 refers to speed 112 of aircraft 100 with respect to the air through which aircraft 100 is flying. Ground speed 118 refers to speed 112 of aircraft 100 with respect to the ground over which aircraft 100 is flying. Pilots fly aircraft based mostly on indicated airspeed. However, indicated airspeed is not necessarily the true airspeed. For example, air density and altitude affect true airspeed versus indicated airspeed. This difference may affect the calculation of desired ground speed based on the approach indicated speed and the winds. This effect would add to the ground speed calculated without this taken into account.

State 106 of aircraft 100 at any point in time may be determined by state detectors 120. State detectors 120 may include various devices and systems on aircraft 100 for identifying the current state 106 of aircraft 100. For example, without limitation, location 108 of aircraft 100 may be identified using a global positioning system or other navigation system for determining the current geographic location of aircraft 100. The locations used in the energy calculations described herein may be the distance from a runway, which is used to determine the approach slope height at this distance out, and hence the desired energy.

Pitch 110 of aircraft 100 may be identified using a gyroscope or in another appropriate manner. Airspeed 116 may be identified using a pitot tube or other appropriate airspeed measuring device. Ground speed 118 may be identified using any appropriate ground speed identification system. For example, without limitation, ground speed 118 may be identified using a global positioning system, distance measuring equipment, or any other appropriate system or method for identifying ground speed 118. Altitude 114 of aircraft 100 may be identified using an altimeter or any other appropriate instrument that may be used to identify altitude 114. For example, altitude 114 may be part of location 108 that is determined using a global positioning system. Altitude 114 also is used to determine energy state 121 of aircraft 100 in accordance with an illustrative embodiment.

In accordance with an illustrative embodiment, energy state display system 122 may be configured to identify energy state 121 of aircraft 100. Energy state display system 122 may be configured to display an indication of energy state 121 to operator 102 of aircraft 100 on energy state display 126. Operator 102 may use the indication of energy state 121 displayed on energy state display 126 to operate aircraft 100 in a more effective manner.

Energy state 121 of aircraft 100 may refer to the total kinetic and potential energy of aircraft 100 at a particular point in time. The kinetic energy of aircraft 100 is a function of speed 112. For example, the kinetic energy of aircraft 100 may be identified as $\frac{1}{2}M*V^2$, wherein M is a mass of aircraft 100, and V is ground speed 118 of aircraft 100. In accordance with an illustrative embodiment, energy state display system 122 may identify energy state 121 of aircraft 100 using ground speed 118 to identify the kinetic energy component of energy state 121. The potential energy for aircraft 100 may be identified as $m*g*h$, wherein m is the mass of the aircraft, g is the acceleration due to gravity, e.g., approximately 9.8 meters per second squared, and h is altitude 114 of aircraft 100. Energy state 121 then may be identified as the sum of the kinetic and potential energy of aircraft 100.

In accordance with an illustrative embodiment, the indication of energy state 121 presented to operator 102 in energy state display 126 may be an indication of relative energy state 128. Relative energy state 128 may refer to the difference between energy state 121 of aircraft 100 and desired energy state 115 for aircraft 100. For example, energy state 121 of aircraft 100 may be identified at a particular point where aircraft 100 is descending in an approach for landing. Desired energy state 115 may identify the energy of aircraft 100 at the energy state corresponding to the altitude of the approach slope at the current distance of the aircraft from the runway and the desired ground speed.

In this case, relative energy state 128, the difference between energy state 121 and desired energy state 115, identifies whether aircraft 100 currently has too much energy or too little energy relative to the ideal energy state which would correspond to flying the approach slope exactly at the correct altitude and at the desired ground speed. This will cause aircraft 100 to land at the desired point on the runway at the desired ground speed 118. By displaying an indication of relative energy state 128 to operator 102 on energy state display 126 in an appropriate manner, operator 102 may be able to identify any appropriate action that may be needed for controlling aircraft 100 to land aircraft 100 at the desired point on the runway and at the desired ground speed 118 and airspeed 116.

Energy state display system 122 may identify relative energy state 128 for aircraft 100 from state information 132 provided to energy state display system 122 from state detectors 120. For example, state information 132 may include information identifying the current ground speed 118 and altitude 114 of aircraft 100. In accordance with an illustrative embodiment, relative energy state 128 may be identified by energy state display system 122 in a manner that does not require knowledge of the mass of aircraft 100.

Energy state display 126 may be updated continuously. For example, without limitation, energy state display 126 may update at least 10 times per second or at another appropriate rate.

Energy state display 126 may be displayed to operator 102 on any appropriate operator interface system 134. For example, without limitation, operator interface system 134 may be located on the flight deck or in any other appropriate location on aircraft 100. Operator interface system 134 may comprise any appropriate display device 136 and input device 138. Display device 136 may be configured for displaying energy state display 126 to operator 102. Input device 138 may be configured for receiving input 140 from operator 102. For example, energy state display 126 displayed on display device 136 may prompt operator 102 to enter a desired ground speed 118 for landing aircraft 100. The desired ground speed 118 for landing aircraft 100 may be provided as input 140 by operator 102 using input device 138. The desired ground speed 118 of aircraft 100 at landing may be provided to energy state display system 122 from operator interface system 134. The desired ground speed 118 of aircraft 100 at landing may define desired energy state 115 for aircraft 100 as aircraft 100 is descending in approach for landing. Therefore, energy state display system 122 may use the desired ground speed 118 for aircraft 100 at landing to identify relative energy state 128.

The illustration of FIG. 1 is not meant to imply physical or architectural limitations to the manner in which different illustrative embodiment may be implemented. Other components in addition to, in place of, or both in addition to and in place of the ones illustrated may be used. Some components may be unnecessary in some illustrative embodiments. Also, the blocks are presented to illustrate some functional components. One or more of these blocks may be combined or divided into different blocks when implemented in different illustrative embodiments. For example, energy state display system 122 and operator interface system 134 may be located on aircraft 100. In this case, the information presented on energy state display 126 may be used by flight crew 104 onboard aircraft 100 to control aircraft 100 in a more effective manner. In another example, operator 102 may operate aircraft 100 from a remote location that is not onboard aircraft 100. For example, aircraft 100 may be an unmanned aircraft that is operated by operator 102 from a remote location that is not onboard aircraft 100. In this case, energy state display system 122 and operator interface system 134 may be located at the remote location from which operator 102 controls the operation of aircraft 100. In this case, state detectors 120 onboard aircraft 100 may provide state information 132 from aircraft 100 to energy state display system 122 via any appropriate communications system for providing communications between aircraft 100 and energy state display system 122 located at a remote location from aircraft 100.

In another example, operator 102 of aircraft 100 may include an automatic control system for controlling the operation of aircraft 100 or an automatic control system in combination with a human operator for controlling the operation of aircraft 100. In this example, an indication of energy state 124 of aircraft 100, such as an indication of relative energy state 128, may be identified and provided to the automatic control system. The automatic control system may be configured to use the energy state information that is provided to control aircraft 100 in a more effective manner.

Figure 2:
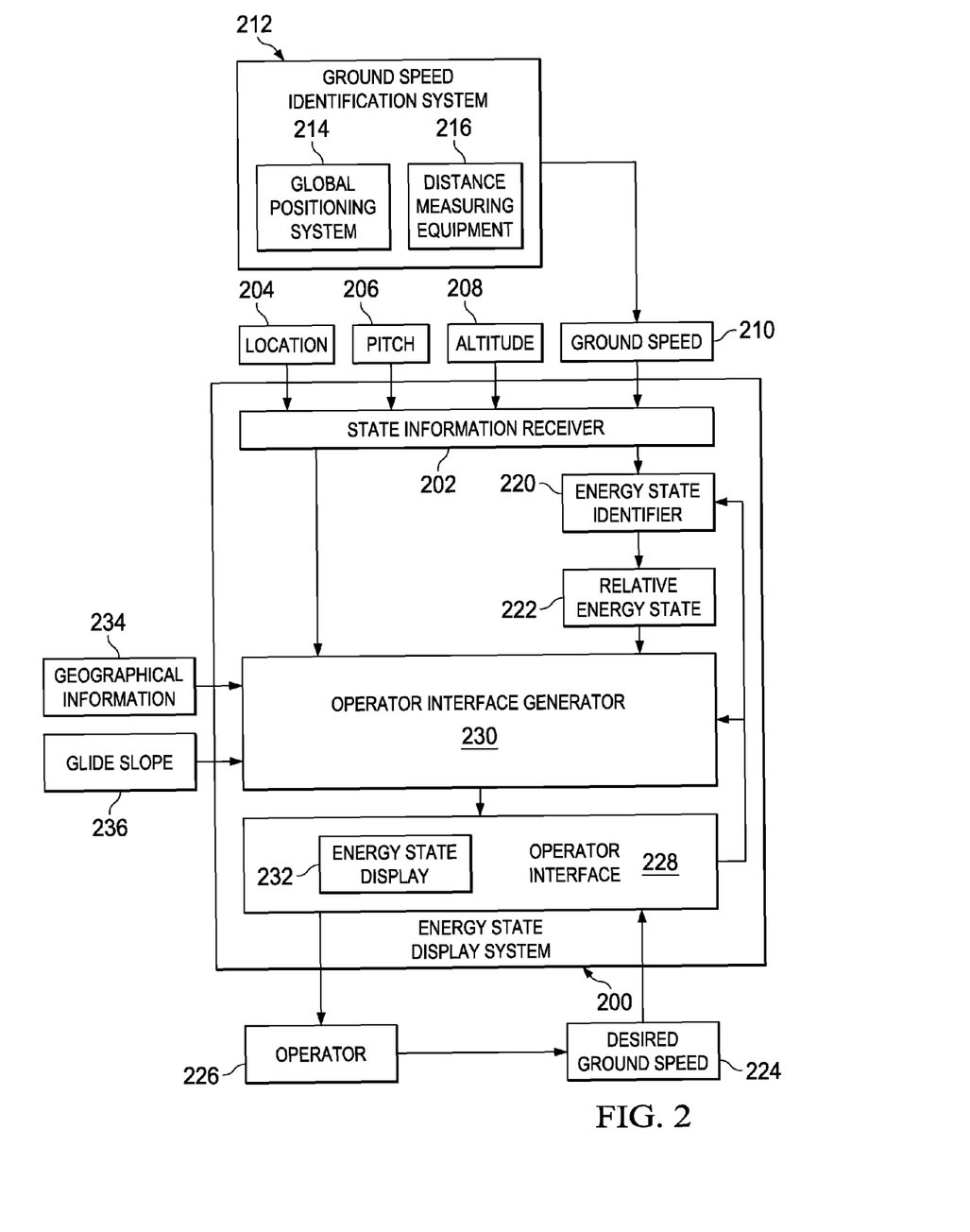
FIG. 2 is an illustration of a block diagram of an energy state display system in accordance with an illustrative embodiment.

Turning now to FIG. 2, an illustration of a block diagram of an energy state display system is depicted in accordance with an illustrative embodiment. In this example, energy state display system 200 is an example of one implementation of energy state display system 122 in FIG. 1.

Energy state display system 200 may include state information receiver 202. State information receiver 202 may be configured to receive information identifying the current state of an aircraft from various state detectors on the aircraft. For example, without limitation, state information receiver 202 may be configured to receive information identifying location 204, pitch 206, altitude 208, ground speed 210, or other conditions or combinations of conditions of the aircraft.

Ground speed 210 may be identified by ground speed identification system 212. Ground speed identification system 212 may include any appropriate device, system, or method for identifying ground speed 210 of an aircraft. For example, without limitation, ground speed identification system 212 may include global positioning system 214, distance measuring equipment 216, or any other system or equipment or combinations of systems and equipment that may be used to identify ground speed 210 of the aircraft.

State information received by state information receiver 202 may be provided to energy state identifier 220 in energy state display system 200. For example, without limitation, energy state identifier 220 may be configured to identify relative energy state 222 for the aircraft from altitude 208 and ground speed 210 of the aircraft along with desired ground speed 224. Desired ground speed 224 may be provided to energy state display system 200 as input from operator 226 of the aircraft using operator interface 228.

Relative energy state 222 may be provided from energy state identifier 220 to operator interface generator 230 in energy state display system 200. Operator interface generator 230 may be configured to generate energy state display 232 for displaying an indication of relative energy state 222. Operator interface generator 230 may use state information for the aircraft from state information receiver 202, geographical information 234, and information identifying glide slope 236 of the aircraft to generate energy state display 232.

For example, without limitation, geographical information 234 and glide slope 236 may be obtained by operator interface generator 230 from a number of databases or other sources of information that may be part of, or accessible by, energy state display system 200.

Energy state display 232 also may be configured to prompt operator 226 to input information via operator interface 228. Such information input by operator 226 may be used by energy state identifier 220, included in energy state display 232 by operator interface generator 230, or both. For example, desired ground speed 224 input by operator 226 via operator interface 228 may be used by energy state identifier 220 to identify relative energy state 222 and may be displayed in energy state display 232 generated by operator interface generator 230.

Figure 3:
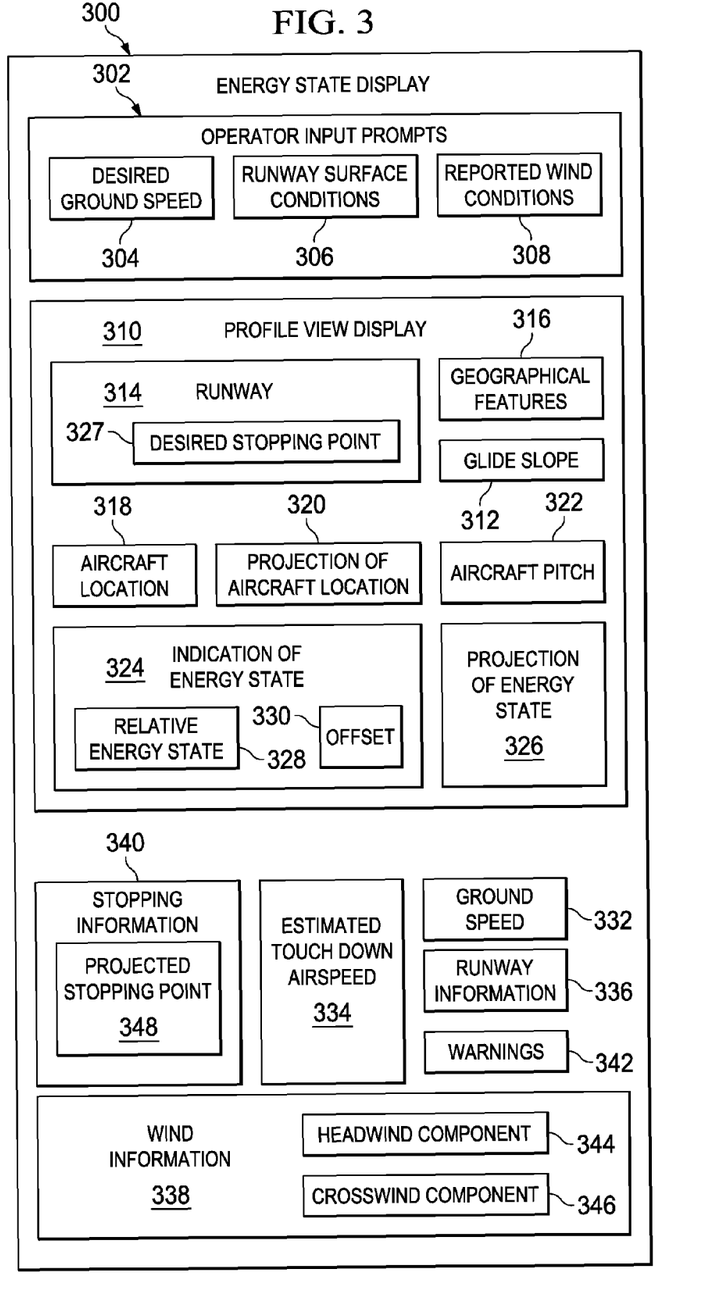
FIG. 3 is an illustration of a block diagram of an energy state display in accordance with an illustrative embodiment.

Turning now to FIG. 3, an illustration of a block diagram of an energy state display is depicted in accordance with an illustrative embodiment. In this example, energy state display 300 may be an example of one implementation of energy state display 126 in FIG. 1 or energy state display 232 in FIG. 2.

Energy state display 300 may include operator input prompts 302. For example, without limitation, operator input prompts 302 may prompt the operator of an aircraft to input information related to a landing such as desired ground speed 304, runway surface conditions 306, reported wind conditions 308, or other information or combinations of information. Information input by the operator in response to operator input prompts 302 may be displayed as part of energy state display 300.

Energy state display 300 also may include profile view display 310. Profile view display 310 may present a profile view of an aircraft approach to landing. For example, without limitation, profile view display 310 may include graphical or other representations or indications of glide slope 312, runway 314, geographical features 316, aircraft location 318, projection of aircraft location 320, aircraft pitch 322, indication of energy state 324, and projection of energy state 326. For example, desired stopping point 327 for an aircraft landing on runway 314 may be any appropriate point on runway 314. Indication of energy state 324 may be an indication of relative energy state 328. For example, without limitation, indication of energy state 324 may be displayed as offset 330 from glide slope 312 to indicate relative energy state 328.

Other information that may be displayed in energy state display 300 may include ground speed 332, estimated touch down airspeed 334, runway information 336, wind information 338, stopping information 340, and warnings 342. Wind information 338 may include headwind component 344 and crosswind component 346 of wind at landing. Stopping information 340 may include information for identifying projected stopping point 348. Projected stopping point 348 may be a point on or near a runway at which the aircraft with the current energy state attempting a landing is projected to be able to stop. Warnings 342 may include indications that the current energy state of the aircraft is too high or too low to perform a landing. For example, warnings 342 may indicate that projected stopping point 348 is short of the runway or beyond the end of the runway.

Figure 4:
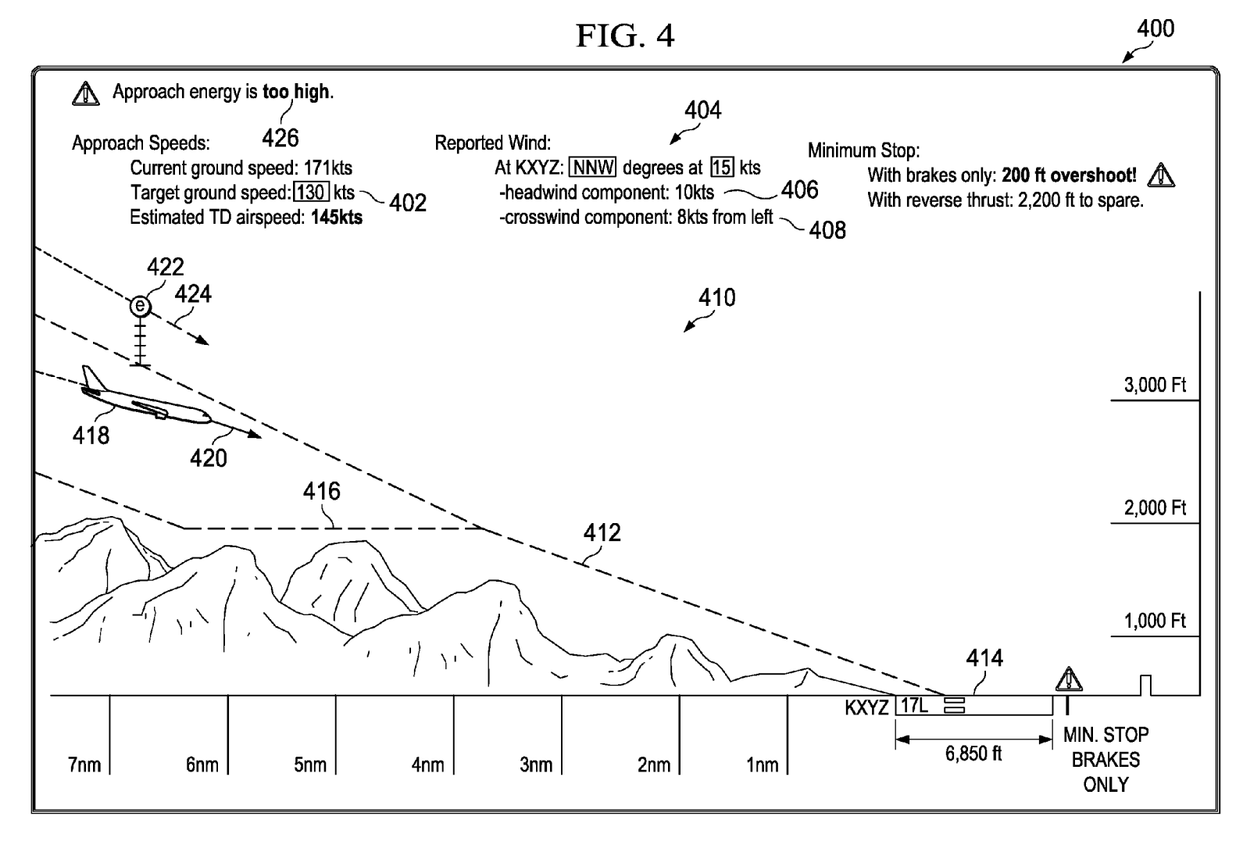
FIG. 4 is an illustration of an example of an energy state display in accordance with an illustrative embodiment.

Turning now to FIG. 4, an illustration of an example of an energy state display is depicted in accordance with an illustrative embodiment. In this example, energy state display 400 is an example of one implementation of energy state display 126 in FIG. 1, energy state display 232 in FIG. 2, or energy state display 300 in FIG. 3.

In this example, energy state display 400 may prompt an operator to enter target ground speed 402 and information identifying reported winds 404 at landing. Headwind component 406 and crosswind component 408 of the wind at landing may be determined from reported winds 404 and displayed on energy state display 400.

Energy state display 400 may include profile view display 410. Profile view display 410 may present a profile view of an approach to landing. For example, profile view display 410 may include line 412 indicating glide slope, a graphical representation of runway 414, and graphical representation 416 of geographical features on the approach to landing.

An appropriate symbol 418 may be displayed to indicate the location of the aircraft. For example, without limitation, symbol 418 may represent a side view of an aircraft. Arrow 420 extending from symbol 418 may be displayed to indicate a projection of the aircraft location from the current location. The orientation of symbol 418 may indicate the pitch of the aircraft.

Any appropriate symbol 422 may be used as an indication of the energy state of the aircraft. Arrow 424 extending from symbol 422 may indicate a projection of the energy state from the current energy state. The vertical position of symbol 422 with respect to line 412 indicating the glide slope may indicate the energy state of the aircraft relative to the desired energy state. In this example, the position of symbol 422 indicates that the energy state of the aircraft is greater than desired. Therefore, in this case, warning 426 may be displayed to indicate that the energy of the aircraft for the approach is too high.

Figure 5:
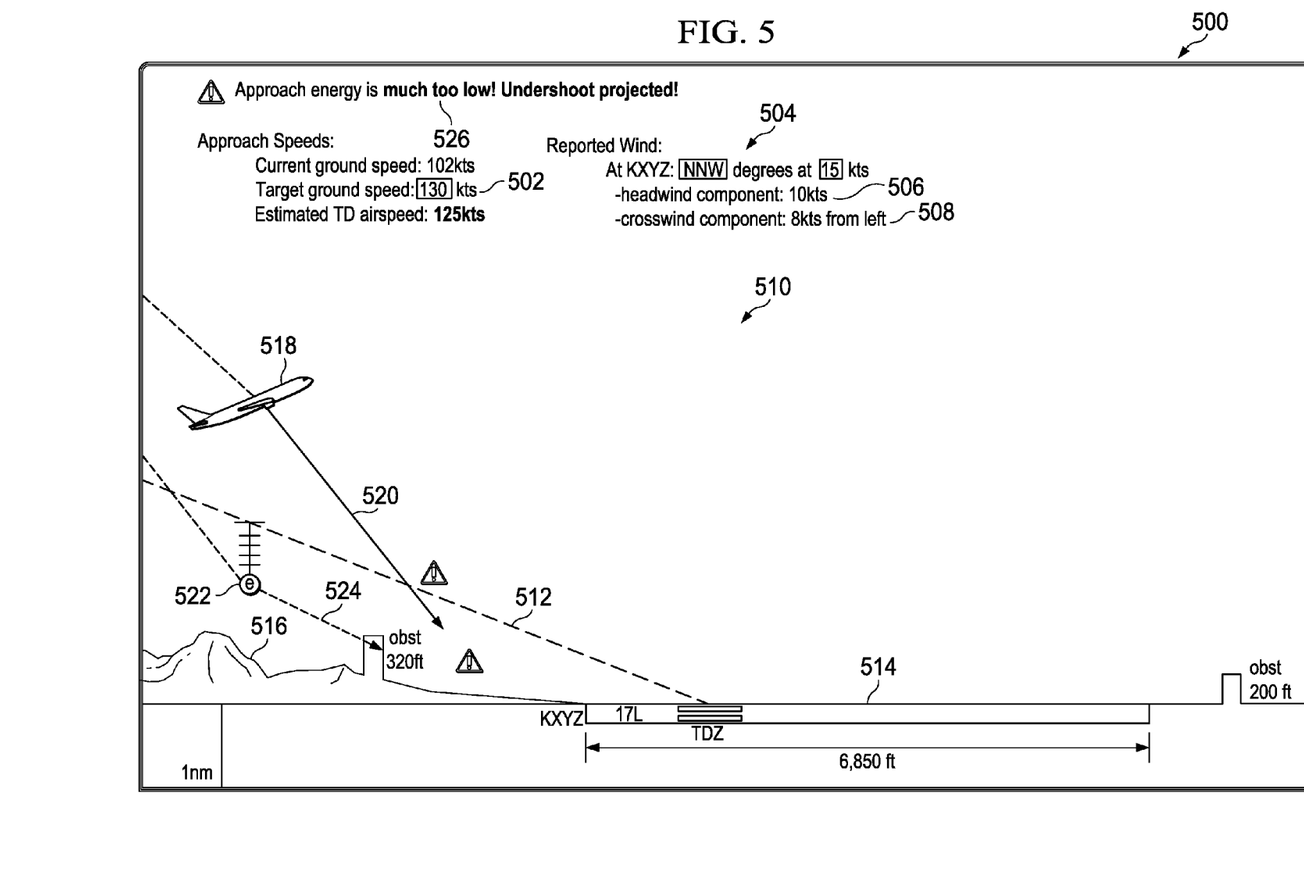
FIG. 5 is an illustration of another example of an energy state display in accordance with an illustrative embodiment.

Turning now to FIG. 5, an illustration of another example of an energy state display is depicted in accordance with an illustrative embodiment. In this example, energy state display 500 is another example of one implementation of energy state display 126 in FIG. 1, energy state display 232 in FIG. 2, or energy state display 300 in FIG. 3.

In this example, energy state display 500 may prompt an operator to enter target ground speed 502 and information identifying reported winds 504 at landing. Headwind component 506 and crosswind component 508 of the wind at landing may be determined from reported winds 504 and displayed on energy state display 500.

Energy state display 500 may include profile view display 510. Profile view display 510 may present a profile view of an approach to landing. For example, profile view display 510 may include line 512 indicating glide slope, a graphical representation of runway 514, and graphical representation 516 of geographical features on the approach to landing.

An appropriate symbol 518 may be displayed to indicate the location of the aircraft. For example, without limitation, symbol 518 may represent a side view of an aircraft. Arrow 520 extending from symbol 418 may be displayed to indicate a projection of the aircraft location from the current location. The orientation of symbol 418 may indicate the pitch of the aircraft.

Any appropriate symbol 522 may be used as an indication of the energy state of the aircraft. Arrow 524 extending from symbol 522 may indicate a projection of the energy state from the current energy state. The vertical position of symbol 522 with respect to line 512 indicating the glide slope may indicate the energy state of the aircraft relative to the desired energy state. The amount of vertical displacement of the energy symbol may be calculated by solving the equation: the current energy state of the aircraft minus the desired energy state for the aircraft equals mgh for h, wherein m is the mass of the aircraft, g is the acceleration due to gravity, e.g., approximately 9.8 meters per second squared, and h is altitude. The current energy state and the desired energy state of the aircraft are both a function of m. Therefore, when solving for h, m drops out of this equation, so the mass of the aircraft need not be known to solve this equation for h. The determined value for h then may be plotted to the same scale as the vertical profile view. The zero point of this energy or h scale is set at a point on the approach slope at the current distance of the aircraft from the runway. In this example, the vertical position of symbol 522 with respect to line 512 indicating the glide slope indicates that the energy state of the aircraft is less than desired. Therefore, in this case, warning 526 may be displayed to indicate that the energy of the aircraft for the approach is too low.

Figure 6:
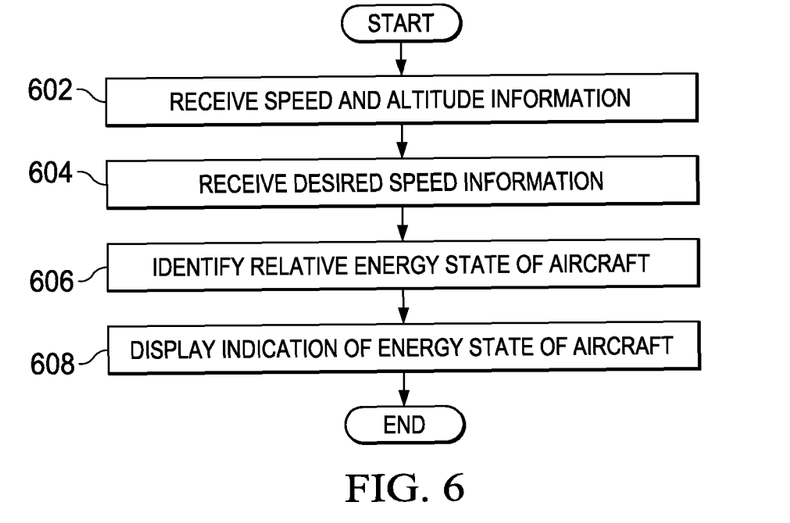
FIG. 6 is an illustration of a flowchart of a process for displaying an energy state of an aircraft in accordance with an illustrative embodiment.

Turning now to FIG. 6, an illustration of a flowchart of a process for displaying an energy state of an aircraft is depicted in accordance with an illustrative embodiment. The process in FIG. 6 may be implemented, for example, in energy state display system 200 in FIG. 2.

The process may begin by receiving speed and altitude information (operation 602). Position information, such as the distance of the aircraft from a runway, also may be received. Desired speed information also may be received (operation 604). For example, desired speed information may be a desired ground speed at landing provided by an operator of the aircraft.

The relative energy state of the aircraft then may be identified (operation 606). For example, the relative energy state may be identified using the received speed and altitude information and the received desired speed information. An indication of the energy state of the aircraft then may be displayed (operation 608), with the process terminating thereafter. For example, an indication of the relative energy state of the aircraft may be displayed in an energy state display.

Figure 7:
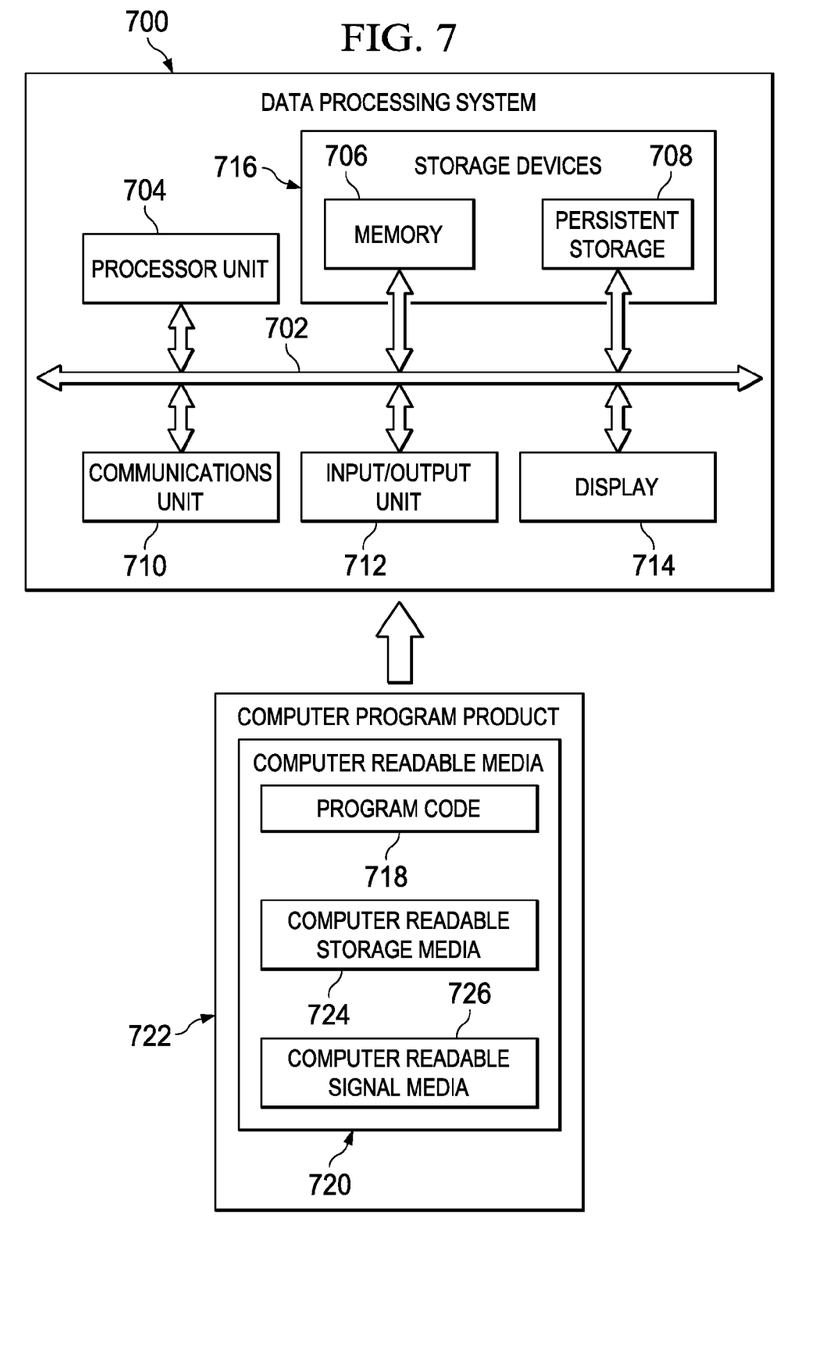
FIG. 7 is an illustration of a block diagram of a data processing system in accordance with an illustrative embodiment.

Turning now to FIG. 7, an illustration of a block diagram of a data processing system is depicted in accordance with an illustrative embodiment. In this example, data processing system 700 is an example of one implementation of a data processing system for implementing energy state display system 200 in FIG. 2.

In this illustrative example, data processing system 700 includes communications fabric 702. Communications fabric 702 provides communications between processor unit 704, memory 706, persistent storage 708, communications unit 710, input/output (I/O) unit 712, and display 714. Memory 706, persistent storage 708, communications unit 710, input/output (I/O) unit 712, and display 714 are examples of resources accessible by processor unit 704 via communications fabric 702.

Processor unit 704 serves to run instructions for software that may be loaded into memory 706. Processor unit 704 may be a number of processors, a multi-processor core, or some other type of processor, depending on the particular implementation. Further, processor unit 704 may be implemented using a number of heterogeneous processor systems in which a main processor is present with secondary processors on a single chip. As another illustrative example, processor unit 704 may be a symmetric multi-processor system containing multiple processors of the same type.

Memory 706 and persistent storage 708 are examples of storage devices 716. A storage device is any piece of hardware that is capable of storing information, such as, for example, without limitation, data, program code in functional form, and other suitable information either on a temporary basis or a permanent basis. Storage devices 716 also may be referred to as computer readable storage devices in these examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these examples, provides for communications with other data processing systems or devices. In these examples, communications unit 710 is a network interface card. Communications unit 710 may provide communications through the use of either or both physical and wireless communications links.

Input/output (I/O) unit 712 allows for input and output of data with other devices that may be connected to data processing system 700. For example, input/output (I/O) unit 712 may provide a connection for user input through a keyboard, a mouse, and/or some other suitable input device. Further, input/output (I/O) unit 712 may send output to a printer. Display 714 provides a mechanism to display information to a user.

Instructions for the operating system, applications, and/or programs may be located in storage devices 716, which are in communication with processor unit 704 through communications fabric 702. In these illustrative examples, the instructions are in a functional form on persistent storage 708. These instructions may be loaded into memory 706 for execution by processor unit 704. The processes of the different embodiments may be performed by processor unit 704 using computer-implemented instructions, which may be located in a memory, such as memory 706.

These instructions are referred to as program instructions, program code, computer usable program code, or computer readable program code that may be read and executed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transferred to data processing system 700 for execution by processor unit 704. Program code 718 and computer readable media 720 form computer program product 722 in these examples. In one example, computer readable media 720 may be computer readable storage media 724 or computer readable signal media 726.

Computer readable storage media 724 may include, for example, an optical or magnetic disk that is inserted or placed into a drive or other device that is part of persistent storage 708 for transfer onto a storage device, such as a hard drive, that is part of persistent storage 708. Computer readable storage media 724 also may take the form of a persistent storage, such as a hard drive, a thumb drive, or a flash memory, that is connected to data processing system 700. In some instances, computer readable storage media 724 may not be removable from data processing system 700.

In these examples, computer readable storage media 724 is a physical or tangible storage device used to store program code 718 rather than a medium that propagates or transmits program code 718. Computer readable storage media 724 is also referred to as a computer readable tangible storage device or a computer readable physical storage device. In other words, computer readable storage media 724 is a media that can be touched by a person.

Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 718 may be downloaded over a network to persistent storage 708 from another device or data processing system through computer readable signal media 726 for use within data processing system 700. For instance, program code stored in a computer readable storage medium in a server data processing system may be downloaded over a network from the server to data processing system 700. The data processing system providing program code 718 may be a server computer, a client computer, or some other device capable of storing and transmitting program code 718.

The different components illustrated for data processing system 700 are not meant to provide architectural limitations to the manner in which different embodiments may be implemented. The different illustrative embodiments may be implemented in a data processing system including components in addition to and/or in place of those illustrated for data processing system 700. Other components shown in FIG. 7 can be varied from the illustrative examples shown. The different embodiments may be implemented using any hardware device or system capable of running program code. As one example, data processing system 700 may include organic components integrated with inorganic components and/or may be comprised entirely of organic components excluding a human being. For example, a storage device may be comprised of an organic semiconductor.

In another illustrative example, processor unit 704 may take the form of a hardware unit that has circuits that are manufactured or configured for a particular use. This type of hardware may perform operations without needing program code to be loaded into a memory from a storage device to be configured to perform the operations.

For example, when processor unit 704 takes the form of a hardware unit, processor unit 704 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 718 may be omitted, because the processes for the different embodiments are implemented in a hardware unit.

In still another illustrative example, processor unit 704 may be implemented using a combination of processors found in computers and hardware units. Processor unit 704 may have a number of hardware units and a number of processors that are configured to run program code 718. With this depicted example, some of the processes may be implemented in the number of hardware units, while other processes may be implemented in the number of processors.

In another example, a bus system may be used to implement communications fabric 702 and may be comprised of one or more buses, such as a system bus or an input/output bus. Of course, the bus system may be implemented using any suitable type of architecture that provides for a transfer of data between different components or devices attached to the bus system.

Additionally, communications unit 710 may include a number of devices that transmit data, receive data, or both transmit and receive data. Communications unit 710 may be, for example, a modem or a network adapter, two network adapters, or some combination thereof. Further, a memory may be, for example, memory 706, or a cache, such as that found in an interface and memory controller hub that may be present in communications fabric 702.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the figures. For example, the functions of two blocks shown in succession may be executed substantially concurrently, or the functions of the blocks may sometimes be executed in the reverse order, depending upon the functionality involved.

The description of the different illustrative embodiments has been presented for purposes of illustration and description and is not intended to be exhaustive or to limit the embodiments in the form disclosed. Many modifications and variations will be apparent to those of ordinary skill in the art. Further, different illustrative embodiments may provide different benefits as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for displaying an energy state of an aircraft, comprising:
    identifying, by a processor unit, the energy state of the aircraft based on a speed of the aircraft and an altitude of the aircraft;
    identifying a relative energy state of the aircraft based on a difference between the energy state of the aircraft and a desired energy state for the aircraft; and
    displaying, by the processor unit, an indication of the energy state, wherein displaying the indication of the energy state comprises displaying an indication of the relative energy state of the aircraft.

2. The method of claim 1, wherein identifying the energy state of the aircraft comprises identifying the energy state of the aircraft based on a ground speed of the aircraft and the altitude of the aircraft.

3. The method of claim 2 further comprising:
    identifying, during an approach of the aircraft to landing on a runway, a projected stopping point for the aircraft using the energy state of the aircraft based on the ground speed of the aircraft; and
    displaying a warning when the projected stopping point for the aircraft is not a desired stopping point for the aircraft on the runway.

4. The method of claim 1, wherein:
    the desired energy state is determined based on a desired ground speed for the aircraft; and
    the indication of the relative energy state identifies how much altitude the aircraft at the desired ground speed would have to have the relative energy state.

5. The method of claim 1 further comprising:
    displaying in a profile view display a representation of a glide slope for the aircraft; and
    displaying the indication of the relative energy state of the aircraft relative to the representation of the glide slope.

6. The method of claim 5, wherein:
    a direction of the indication of the relative energy state from the representation of the glide slope identifies whether the energy state of the aircraft is greater than or less than the desired energy state for the aircraft; and
    a distance of the indication of the relative energy state from the representation of the glide slope identifies an amount by which the energy state of the aircraft is greater than or less than the desired energy state for the aircraft, wherein an amount of vertical displacement of the indication of the relative energy state from the representation of the glide slope is calculated by solving the equation: energy state minus desired energy state equals mgh for h, wherein m is the mass of the aircraft, g is the acceleration due to gravity, and h is altitude, and then converting h to a scale of the profile view display to determine the amount of vertical displacement of the indication of the relative energy state from the representation of the glide slope at a point on the glide slope corresponding to a distance of the aircraft from a runway.

7. An apparatus, comprising:
    an energy state identifier configured to:
        identify an energy state of an aircraft based on a speed of the aircraft and an altitude of the aircraft, and
        identify a relative energy state of the aircraft based on a difference between the energy state of the aircraft and a desired energy state for the aircraft; and
    an operator interface generator configured to generate an energy state display comprising an indication of the relative energy state of the aircraft.

8. The apparatus of claim 7, wherein the energy state identifier is configured to identify the energy state of the aircraft based on a ground speed of the aircraft and the altitude of the aircraft.

9. The apparatus of claim 8, wherein the operator interface generator is further configured to:
    identify, during an approach of the aircraft to landing on a runway, a projected stopping point for the aircraft using the energy state of the aircraft based on the ground speed of the aircraft; and
    display a warning when the projected stopping point for the aircraft is not a desired stopping point for the aircraft on the runway.

10. The apparatus of claim 7, wherein:
    the desired energy state is determined based on a desired ground speed for the aircraft; and
    the indication of the relative energy state identifies how much altitude the aircraft at the desired ground speed would have to have the relative energy state.

11. The apparatus of claim 7, wherein the operator interface generator is configured to:
    display a representation of a glide slope for the aircraft in a profile view display; and
    display the indication of the relative energy state of the aircraft relative to the representation of the glide slope.

12. The apparatus of claim 11, wherein:
    a direction of the indication of the relative energy state from the representation of the glide slope identifies whether the energy state of the aircraft is greater than or less than the desired energy state for the aircraft; and a distance of the indication of the relative energy state from the representation of the glide slope identifies an amount by which the energy state of the aircraft is greater than or less than the desired energy state for the aircraft.

13. A method for identifying a projected stopping point of an aircraft, comprising:

identifying, by a processor unit, an energy state of the aircraft during an approach to landing using a ground speed of the aircraft and an altitude of the aircraft, wherein identifying the energy state of the aircraft comprises identifying a relative energy state of the aircraft based on a difference between the energy state of the aircraft and a desired energy state for the aircraft, wherein the desired energy state is determined using a desired ground speed for the aircraft;

identifying, by the processor unit, the projected stopping point of the aircraft using the energy state of the aircraft;

displaying a representation of a runway to which the aircraft is making the approach to landing; and displaying an indication of the projected stopping point with respect to the representation of the runway.

14. The method of claim 13 further comprising:

displaying a warning when the projected stopping point is not a desired stopping point for the aircraft.

15. The method of claim 13, wherein an indication of the relative energy state identifies how much altitude the aircraft at the desired ground speed would have to have the relative energy state.

16. The method of claim 13 further comprising:

displaying in a profile view display the representation of the runway, a representation of a glide slope for the aircraft, and an indication of the relative energy state of the aircraft relative to the representation of the glide slope.

* * * * *